(12) United States Patent (10) Patent No.: US 9,085,115 B2
Yoshikawa et al. (45) Date of Patent: Jul. 21, 2015

(54) PNEUMATIC TIRE AND METHOD OF FORMING CIRCUMFERENTIAL BELT LAYER OF THE SAME

(75) Inventors: Yusuke Yoshikawa, Kodaira (JP); Hiroshi Nakata, Kodaira (JP); Takashi Oono, Kodaira (JP); Makoto Tsuruta, Akishima (JP)

(73) Assignee: BRIDGESTONE CORPORATION, Tokyo (JP)

( * ) Notice: Subject to any disclaimer, the term of this patent is extended or adjusted under 35 U.S.C. 154(b) by 299 days.

(21) Appl. No.: 13/351,849

(22) Filed: Jan. 17, 2012

(65) Prior Publication Data

US 2012/0180925 A1 Jul. 19, 2012

(30) Foreign Application Priority Data

Jan. 14, 2011 (JP) ................................. 2011-006128

(51) Int. Cl.
*B29D 30/06* (2006.01)
*B29D 30/70* (2006.01)
*B29D 30/08* (2006.01)
(Continued)

(52) U.S. Cl.
CPC ............ *B29D 30/08* (2013.01); *B29D 30/1628* (2013.01); *B29D 30/1635* (2013.01); *B29D 30/3035* (2013.01); *B29D 30/70* (2013.01); *B60C 9/18* (2013.01); *B60C 9/2204* (2013.04);
(Continued)

(58) Field of Classification Search
CPC ............... B29D 30/70; B29D 30/1628; B29D 30/1635; B29D 30/3028; B60C 9/22; B60C 9/2204; B60C 2009/229; B60C 2009/2035; B60C 2009/2204; B60C 2009/2209; B60C 2009/2219; B60C 2009/2228

USPC ................... 156/117, 130, 397; 152/531, 533
See application file for complete search history.

(56) References Cited

U.S. PATENT DOCUMENTS

| 5,178,703 A * | 1/1993 | Onoda et al. ................... 152/533 |
| 5,316,064 A * | 5/1994 | Tani ............................... 152/531 |
| 2004/0089392 A1* | 5/2004 | Yukawa et al. ................ 152/533 |

FOREIGN PATENT DOCUMENTS

| EP | 1 550 565 A2 | 7/2005 |
| EP | 2 202 095 A1 | 6/2010 |

(Continued)

OTHER PUBLICATIONS

European Office Action, dated Jan. 24, 2013, issued in corresponding European Application No. 12151165.3.

(Continued)

*Primary Examiner* — Geoffrey L Knable
(74) *Attorney, Agent, or Firm* — Sughrue Mion, PLLC (57) ABSTRACT

The present invention relates to a method of forming at least one circumferential belt layer of a pneumatic tire comprising: winding the strip for a half length of an outer circumferential length of the crown portion of the carcass along the tire equatorial plane from a widthwise inner side of the belt end region; winding the strip for the remaining half length while shifting the strip for the width of the strip from a widthwise inner to outer side; winding the strip for the outer circumferential length of the crown portion of the carcass along the tire equatorial plane; winding the strip for the half length of the outer circumferential length of the crown portion of the carcass while shifting the strip for the width of the strip from the widthwise outer to inner side; and winding the strip for the remaining half length along the tire equatorial plane.

2 Claims, 6 Drawing Sheets

(51) Int. Cl.
  *B29D 30/16* (2006.01)
  *B29D 30/30* (2006.01)
  *B60C 9/18* (2006.01)
  *B60C 9/22* (2006.01)

(52) U.S. Cl.
  CPC .. *B60C 2009/2035* (2013.04); *Y10T 152/10765* (2015.01); *Y10T 152/10783* (2015.01)

(56) References Cited

FOREIGN PATENT DOCUMENTS

| | | | |
|---|---|---|---|
| JP | 2-208101 A | | 8/1990 |
| JP | 3-5215 A | | 1/1991 |
| JP | H04-163213 A | | 6/1992 |
| JP | 07-156608 A | * | 6/1995 |
| JP | 2002-19415 A | | 1/2002 |
| JP | 2008-155730 A | | 7/2008 |
| JP | 2009-196600 A | | 9/2009 |

OTHER PUBLICATIONS

Extended European Search Report issued in European Application No. 12151165.3 dated Apr. 25, 2012.

Chinese Office Action, dated Jan. 6, 2014, issued in corresponding Chinese Patent Application No. 201210012915.5.

Japanese Office Action dated Aug. 26, 2014 issued in corresponding Japanese Application No. 2011-006128.

* cited by examiner

PNEUMATIC TIRE AND METHOD OF FORMING CIRCUMFERENTIAL BELT LAYER OF THE SAME

BACKGROUND OF THE INVENTION

1. Field of the Invention

The present invention relates to a pneumatic tire comprising a circumferential belt layer made of a rubber-coated cord extending along a tire equatorial plane and to a method of forming the circumferential belt layer.

2. Description of Related Art

In recent years a tire is flattened due to demand for a faster vehicle with a low-floor. In connection with this, a tread portion is further expanded in the radial direction, that is to say, the amount of the radial expansion (diameter growth) of the tread portion is further increased when the tire is inflated with a normal internal pressure. The increase in the radial expansion of the tread portion causes enhancement of stress concentration in belt ends and degradation of durability performance in the belt ends, in turn, causes early separation at the belt ends.

In other words, in a tire with a small flatness ratio, since the increase in the radial expansion of the tread portion, especially the portion near the shoulder portion when the tire is inflated with an internal pressure becomes a problem, a technique to restrain radial expansion by using a circumferential belt layer in which reinforcing elements extend in the circumferential direction of a tire is necessary.

As the technique to restrain radial expansion by the circumferential belt layer, JP2-208101 discloses a tire comprising a carcass, at least two inclined belt layers disposed on the carcass and at least one circumferential belt layer disposed on a radially inner side of the inclined belt layers, wherein each of the inclined belt layers has a plurality of reinforcing cords extending with an inclination angle of 10° to 40° with respect to the tire equatorial plane and intersecting with each other across the tire equatorial plane and the circumferential belt layer is made of a strip having a plurality of reinforcing cords which are shaped in a wave or zigzag pattern and extending along the tire equatorial plane as a whole.

Figure 1:
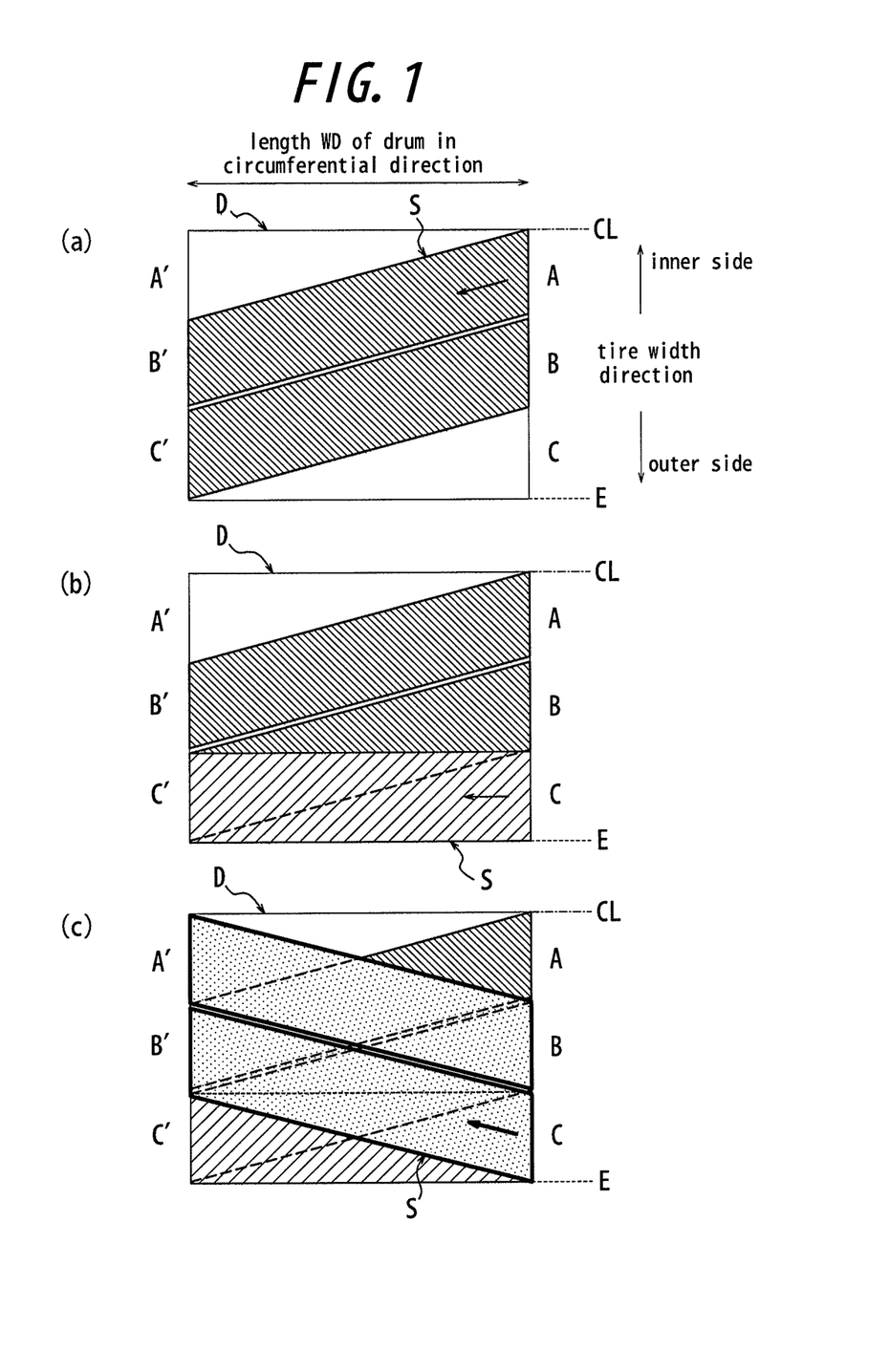
FIG. 1 is a view showing an example of a conventional method of forming a circumferential belt layer.

An example of a conventional method of forming a circumferential belt layer will be described with reference to FIG. 1 showing a development plane view of a drum around which the circumferential belt layer is wound. The circumferential belt layers are formed by spirally winding a strip along the tire equatorial plane, which the strip is made of at least one rubber-coated cord.

Specifically, as shown in FIG. 1 (*a*), the strip S is wound in the direction shown by the arrow on the drum D from a position A adjacent to the tire equatorial plane CL in the inner side in the tire width direction to a position B'. While the strip is wound on the drum D from the position A to the position B' for the length of the drum D, the strip is shifted for the width of the strip S in the outer side in the tire width direction. Successively, the strip S is wound on the drum D from the position B (the positions B' and B indicate the same position) to the position C'.

Next, as shown in FIG. 1 (*b*), the strip S is wound in the direction shown by the arrow on the drum D in parallel to the tire equatorial plane CL from the position C to the position C' to form the edge E in the tire width direction of the circumferential belt layer.

Next as shown in FIG. 1 (*c*), the strip S is wound in the direction shown by the arrow on the drum D from the position C to the position B' and successively, the strip S is wound on the drum D from the position B to the position A'. The subsequent winding of the strip S is not illustrated but the strip is continued to be spirally wound on the drum D.

In FIG. 1 the strip S adjacent to each other slightly keeps away for illustrative purposes but the strip S does not keep away in practice.

In the case where the circumferential belt layer is formed by spirally winding the strip S as mentioned above, if the winding of the strip S is started from the outer side in the tire width direction, a winding start edge and a winding end edge, which are cutting edges of the cord are to be exposed. In this case, separation caused by the winding start edge and the winding end edge may be generated.

Therefore, it is preferable that the winding of the strip S begins in the neighborhood of the tire equatorial plane CL, which is the inner side in the tire width direction, the winding reaches one outer edge and then turned back to the inner side, the winding reaches the other outer edge and then turned back to the inner side and finally the winding is finished near the beginning location of the winding.

In this case, as shown in FIG. 1 (*b*), the circumferential belt layer is wound for the length of the drum D in parallel to the tire equatorial plane CL in the edge E in the tire width direction of the circumferential belt layer. If the strip S is turned back to the inner side without winding the strip S for the length of the drum D in parallel to the tire equatorial plane CL in the edge E, not only hardness in the circumferential direction in the edge of the circumferential belt layer is insufficient to support an internal pressure but also the cord of the edge is broken down due to fatigue since stress in the edge is increased when the tire contacts the ground under load.

SUMMARY OF THE INVENTION

In the case where the circumferential belt layer is formed by using the above-mentioned method, the circumferential belt layers becomes three layers in the neighborhood of the edge E in the tire width direction of the circumferential belt layer.

Figure 2:
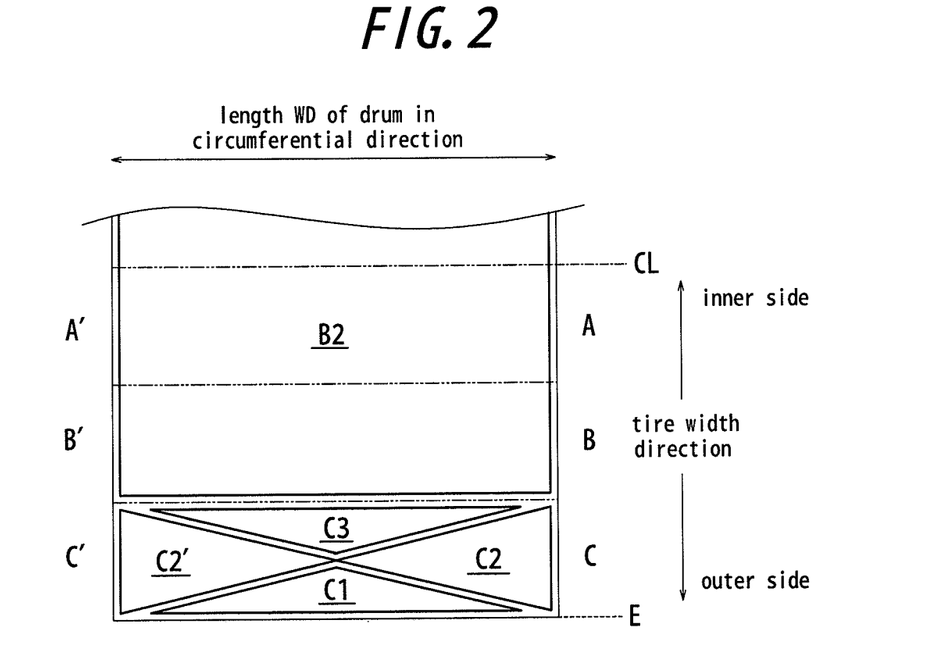
FIG. 2 is a view showing a layer number of a circumferential belt layer laminated on a drum by using a conventional method of forming the circumferential belt layer.

Specifically, with reference to FIG. 2 showing the layer number of the strip S in each region of the circumferential belt layer formed by winding the strip S by the method shown in FIG. 1, the strip S becomes one layer in the region C1, the strip S becomes two layers in the regions B2, C2, C2' and the strip S becomes three layers in the region C3. In this way, three layers of the strips S are overlapped in the region C3 in the neighborhood of the edge E in the tire width direction of the circumferential belt layer. Rubber flows by a pressure from the inside of the tire at the time of tire vulcanization in the region C3 where there are three belt layers, a gauge between the layers becomes extremely thin in the region C3, which causes concentration of strain (distortion) in the region C3 so that the region C3 becomes an origin of a failure.

Therefore, the inventor earnestly studied a method of forming circumferential belt layers by spirally winding a strip to find out that it is effective for solving the above-mentioned problem to modify the winding structure of the strip in the end region in the tire width direction of the circumferential belt layer and achieved the present invention.

It is an object of the present invention to provide a method of forming a circumferential belt layer and a pneumatic tire having the circumferential belt layer formed by spirally winding a strip so that less than three layers of the circumferential belt layers are overlapped in the end region in the tire width direction of the circumferential belt layers.

The subject matter of the present invention is as follows.

(Aspect 1) A method of forming at least one circumferential belt layer of a pneumatic tire, the circumferential belt layer being disposed in a radially outer side of a crown portion of a carcass of the tire and formed by spirally winding a strip in a circumferential direction of the tire, the strip being made of at least one rubber-coated cord extending along a tire equatorial plane, the method comprising:

assuming that a region having twice the width of the strip from an edge in a tire width direction of the circumferential belt layer toward the tire equatorial plane is defined as a belt end region, winding the strip for a half length of an outer circumferential length of the crown portion of the carcass along the tire equatorial plane from a widthwise inner side of the belt end region;

winding the strip for the remaining half length while shifting the strip for the width of the strip from a widthwise inner to outer side;

winding the strip for the outer circumferential length of the crown portion of the carcass along the tire equatorial plane;

winding the strip for the half length of the outer circumferential length of the crown portion of the carcass while shifting the strip for the width of the strip from the widthwise outer to inner side; and winding the strip for the remaining half length along the tire equatorial plane.

In this specification, the term "cord extending along a tire equatorial plane" includes a cord extending parallel to the tire equatorial plane and a cord slightly inclined with respect to the tire equatorial plane (inclination angle of around 2 degrees) when a strip embedded with the cord is spirally wound.

In addition, the terms "half length of an outer circumferential length of the crown portion of the carcass", "the remaining half length" and "outer circumferential length" have a margin of plus or minus 5% of the respective length.

(Aspect 2) The method of forming at least one circumferential belt layer of a pneumatic tire according to the first aspect, further comprising:

winding the strip for the half length of the outer circumferential length of the crown portion of the carcass along the tire equatorial plane;

winding the strip for the remaining half length while shifting the strip for the width of the strip in the width direction; and repeating the winding steps in order to form the circumferential belt layer in a belt central region which is next to the belt end region.

(Aspect 3) A pneumatic tire comprising:

a pair of bead portions;

a carcass toroidally extending between the bead portions;

at least one circumferential belt layer disposed on a radially outer side of a crown portion of the carcass and formed by spirally winding a strip in a tire circumferential direction, the strip having at least one rubber-coated cord extending along a tire equatorial plane; and a tread disposed on a radially outer side of the circumferential belt layer; wherein the circumferential belt layer is formed by using a method comprising:

assuming that a region having twice the width of the strip from an edge in a tire width direction of the circumferential belt layer toward the tire equatorial plane is defined as a belt end region, winding the strip for a half length of an outer circumferential length of the crown portion of the carcass along the tire equatorial plane from a widthwise inner side of the belt end region;

winding the strip for the remaining half length while shifting the strip for the width of the strip from a widthwise inner to outer side;

winding the strip for the outer circumferential length of the crown portion of the carcass along the tire equatorial plane;

winding the strip for the half length of the outer circumferential length of the crown portion of the carcass while shifting the strip for the width of the strip from the widthwise outer to inner side; and winding the strip for the remaining half length along the tire equatorial plane.

(Aspect 4) The pneumatic tire according to the third aspect, wherein an inclination direction with respect to the tire equatorial plane of the strip forming the circumferential belt layer disposed in a radially inner side is different from an inclination direction with respect to the tire equatorial plane of the strip forming the circumferential belt layer disposed in a radially outer side.

(Aspect 5) The pneumatic tire according to the third aspect, wherein the circumferential belt layer has an inextensible cord which is shaped in a wave or zigzag pattern.

(Aspect 6) The pneumatic tire according to the third aspect, wherein the circumferential belt layer has a width of not less than 70% of a total width of the tire.

The widths of the inclined belt layer and the circumferential belt layer and the total width of a tire are measured when the tire is mounted on an application rim and inflated with the maximum air pressure under the maximum load capacity specified in JATMA/TRA/ETRTO.

(Aspect 7) The pneumatic tire according to the third aspect, further comprising at least two inclined belt layers disposed on a radially outer side of the circumferential belt layer wherein, each of the inclined belt layers has at least one rubber-coated cord extending in a direction inclined with respect to the tire equatorial plane with an inclination angle of not less than 40° with respect to tire equatorial plane and the cords of the inclined belt layers intersect with each other across the tire equatorial plane.

(Aspect 8) The pneumatic tire according to the third aspect, further comprising at least two inclined belt layers disposed on a radially outer side of the circumferential belt layer wherein, each of the inclined belt layers has at least one rubber-coated cord extending in a direction inclined with respect to the tire equatorial plane and the inclined belt layers have a width of not less than 70% of a total width of the tire.

According to the present invention, a pneumatic tire with improved belt durability can be provided.

DESCRIPTION OF THE PREFERRED EMBODIMENTS

Hereinafter, a pneumatic tire and a method of forming a circumferential belt layer of the present invention will be described in detail with reference to the drawings.

Figure 3:
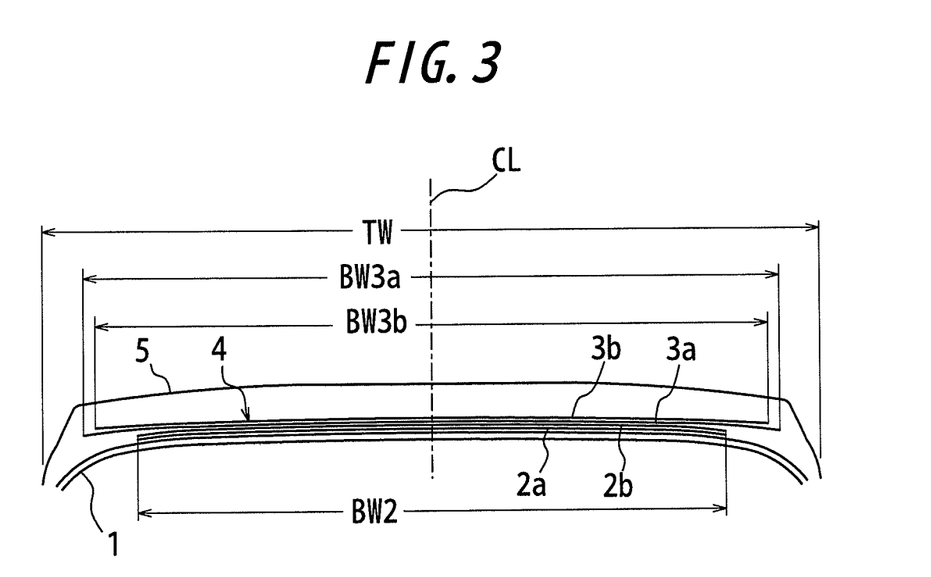
FIG. 3 is a tire widthwise sectional view of a portion of a pneumatic tire according to the present invention.

FIG. 3 shows a tire widthwise sectional view of a portion of a pneumatic tire according to the present invention. A pneumatic tire comprises a pair of bead portions (not shown); a carcass 1 toroidally extending between the bead portions; a belt 4 comprising two circumferential belt layers 2a, 2b and two inclined belt layers 3a, 3b laminated in this order on a radially outer side of a crown portion of the carcass 1; and a tread disposed on a radially outer side of the belt 4. Each of the circumferential belt layers 2a, 2b has at least one rubber-coated cord extending along a tire equatorial plane CL. Each of the inclined belt layers 3a, 3b has at least one rubber-coated cord extending in a direction inclined with respect to the tire equatorial plane CL and the cord of the inclined belt layer 3a intersects with the cord of the inclined belt layer 3b.

It is noted that the carcass 1, the belt 4 and the tread 5 are not limited to the illustrated example but the carcass may comprise two carcass plies and the inclined belt layers 3a, 3b may not be provided, for example.

Next, a method of forming the circumferential belt layers 2a, 2b will be described. The circumferential belt layers 2a, 2b are formed by spirally winding a strip having at least one rubber-coated cord along the tire equatorial plane CL. Specific example will be described with reference to FIG. 4.

Figure 4:
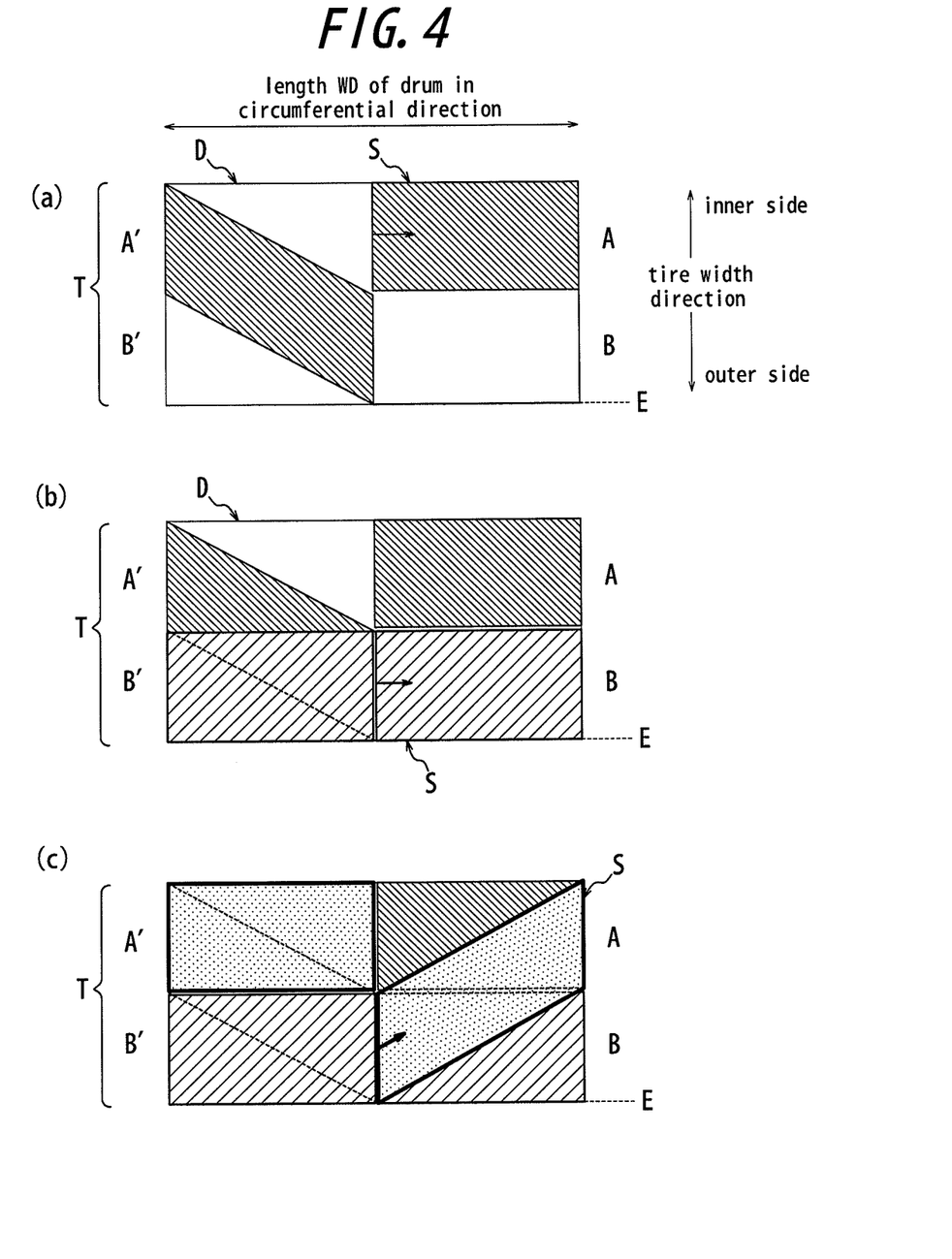
FIG. 4 is a view showing a method of forming a circumferential belt layer of the present invention.

A region having twice the width of the strip S from an edge E in the tire width direction of the circumferential belt layer toward the tire equatorial plane CL is defined as a belt end region T. FIG. 4 is a view showing a method of forming the circumferential belt layer in this belt end region T.

First, as shown in FIG. 4 (a), the strip S is wound in the direction shown by the arrow on a drum D in parallel to the tire equatorial plane CL from an intermediate position between positions A and A' to the position A in the widthwise inner side of the belt end region T for the half length of the drum D. Successively, the strip S is wound on the drum D in such a manner that the strip S is shifted for the width of the strip S from the position A' (the positions A' and A indicate the same position) to an intermediate position between positions B and B' for the half length of the drum D.

Next, as shown in FIG. 4 (b), the strip S is wound in the direction shown by the arrow on the drum D in parallel to the tire equatorial plane CL from the intermediate position between the positions B and B' for the length of the drum D to form the edge E in the tire width direction of the circumferential belt layer.

Next, as shown in FIG. 4 (c), the strip S is wound in the direction shown by the arrow on the drum D in such a manner that the strip S is shifted for the width of the strip S from the intermediate position between the positions B and B' to the position A for the half length of the drum D. Successively, the strip S is wound on the drum D in parallel to the tire equatorial plane CL from the position A' to the intermediate position between positions A and A' for the half length of the drum D.

In FIG. 4 the strip S adjacent to each other slightly keeps away for illustrative purposes but the strip S does not keep away in practice. The half length of the drum D includes an error of 5% of the length WD of the drum D in the circumferential direction. That is to say, the half length of the drum D is (0.5±0.05)×WD.

Though the subsequent winding of the strip S in an inner region in the tire width direction than the belt end region T is not illustrated, the strip S is wound until the other belt end region and then turned back to the inner side in the tire width direction. The winding of the strip S ends near the winding start position (generally near the tire equator plane CL).

According to such winding, an inclination direction with respect to the tire equatorial plane CL of the strip S forming the circumferential belt layer disposed in a radially inner side is different from an inclination direction with respect to the tire equatorial plane CL of the strip S forming the circumferential belt layer disposed in a radially outer side. Specific example will be explained with reference to FIG. 5.

Figure 5:
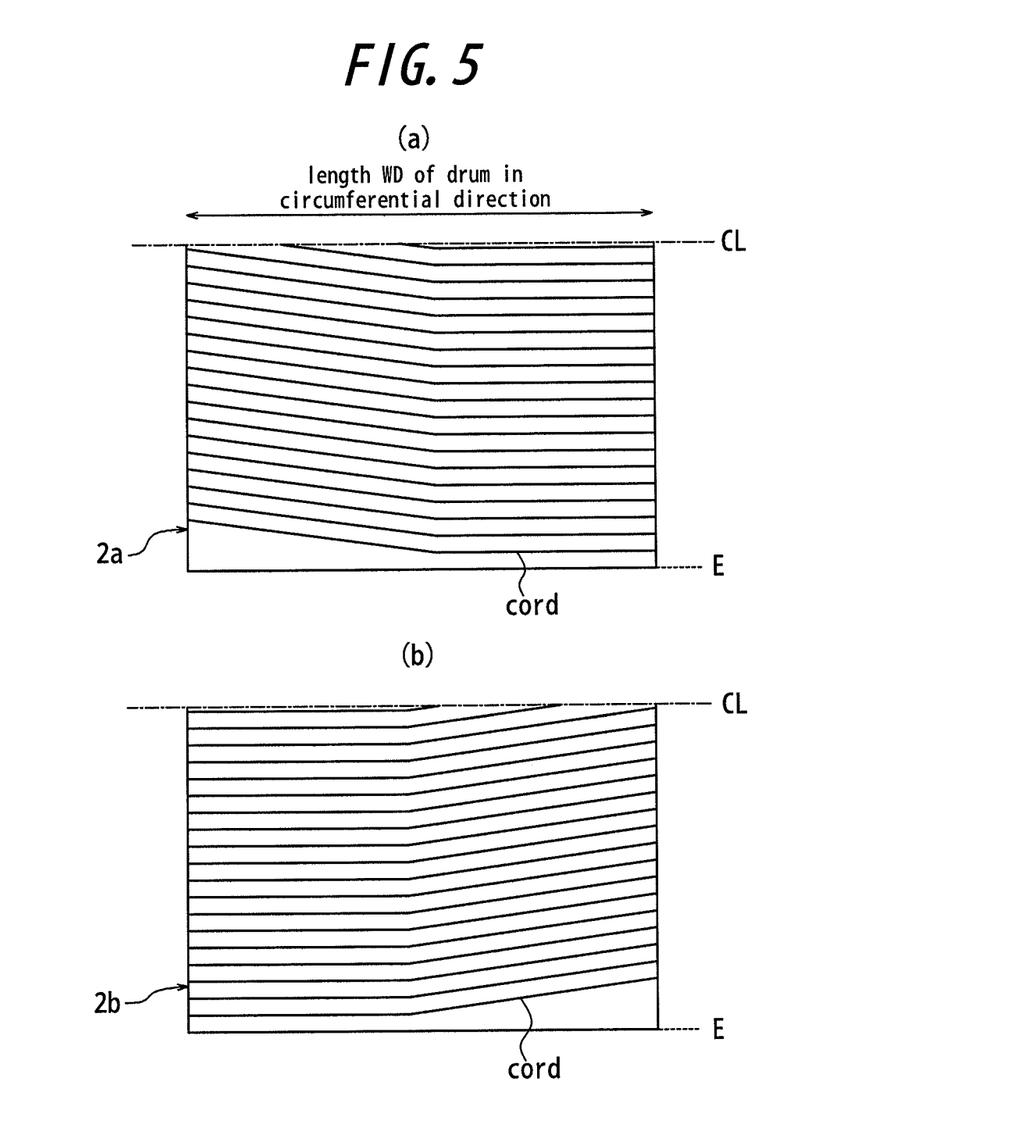
FIG. 5 shows an inclination angle of a cord of a circumferential belt layer.

As shown in FIG. 5 (a), the cords of the circumferential belt layer 2a disposed in the radially inner side form downward-sloping lines in a region (left side in FIG. 5(a)) corresponding to the half length WD/2 of the drum D while the cords in a region (right side in FIG. 5(a)) corresponding to the remaining half length WD/2 of the drum D extend parallel to the tire equatorial plane CL.

As shown in FIG. 5 (b), the cords of the circumferential belt layer 2b disposed in the radially outer side form upward-sloping lines in a region (right side in FIG. 5(b)) corresponding to the half length WD/2 of the drum D while the cords in a region (left side in FIG. 5(b)) corresponding to the remaining half length WD/2 of the drum D extend parallel to the tire equatorial plane CL.

Figure 6:
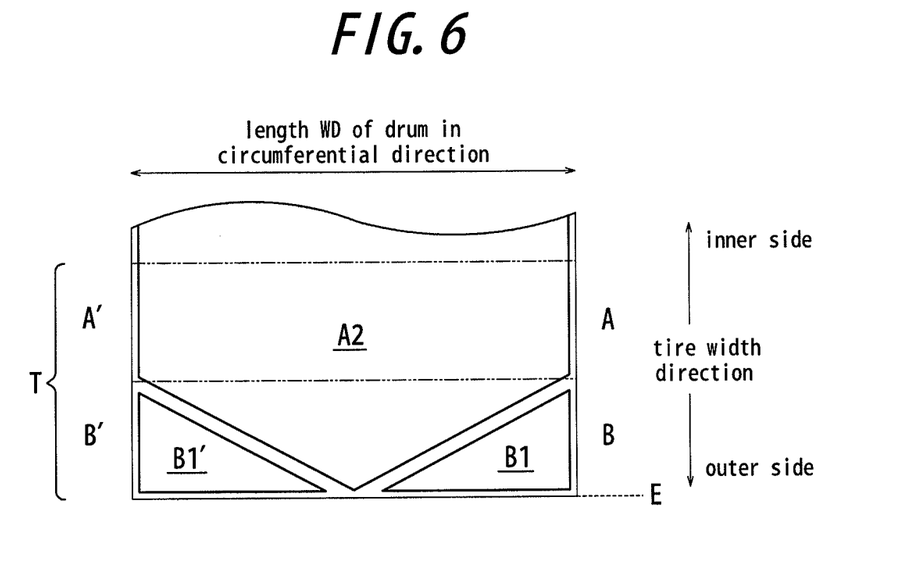
FIG. 6 is a view showing a layer number of a circumferential belt layer laminated on a drum by using a method of forming the circumferential belt layer of the present invention.

FIG. 6 is a view showing a layer number of the strip S in each region of the belt end region T of the circumferential belt layer formed by winding the strip S by using the method shown in FIG. 4. There is one layer of the strip S in the regions B1 and B1' and there are two layers of the strips S in the region A2.

In this way, since there is no region where three layers of the strips S are overlapped in the belt end region T of the circumferential belt layer, it is possible to prevent the above-mentioned problem that a gauge between the layers becomes thin in the region where three layers of the strips are overlapped, which causes concentration of strain (distortion) in this region so that this region becomes an origin of a failure.

The circumferential belt layer may be broken down due to separation generated in the edge E in the tire width direction of the circumferential belt layer during running. It is known that this breakdown is due to shear strain generated between the circumferential belt layers and the inclined belt layers. The inventor earnestly studied this shear strain to find out that the probability of this breakdown is increased if the circumferential belt layers become three layers in the region having the width (about 20 mm) of the strip S from the edge E in the tire width direction of the circumferential belt layer.

This breakdown occurs in the region having the width of the strip S from the edge E of the tire width direction of the circumferential belt layer. When distribution in the width direction of shear strain between the circumferential belt layers and the inclined belt layers is examined, it is found that strain is suddenly increased in the region having the width of the strip S from the edge E in the tire width direction of the circumferential belt layer. The shear strain between the layers occurs due to difference in displacement in the circumferential direction between the circumferential belt layers and the inclined belt layers. It is stem from the fact that the inclined belt layers are largely and rapidly deformed in the region having the width of the strip S from the edge E in the tire width direction of the circumferential belt layer.

According to the method of forming the circumferential belt layer of the present invention, since the circumferential belt layers do not become three layers, it is possible to prevent the problem that a gauge between the layers becomes thin in the region where three layers of the strips are overlapped, which causes concentration of strain (distortion) in this region so that this region becomes an origin of a failure. In addition, it is possible to prevent separation generated in the edge E in the tire width direction of the circumferential belt layer. Therefore, durability can be significantly improved.

Next, with reference to FIG. 3, preferred embodiments of the present invention will be described.

It is preferable that the circumferential belt layers 2a, 2b have an inextensible cord which is shaped in a wave or zigzag pattern.

It is preferable that the circumferential belt layers 2a, 2b have the width BW2 of not less than 70% of the total width TW of the tire. Since the region with large radial expansion is located inside of the region of less than 70% of the tire total width TW, it is necessary to dispose the circumferential belt layers 2a, 2b in this region to prevent radial expansion. It is preferable that the circumferential belt layers 2a, 2b have the upper limit of the width BW2 of 90% of the total width TW due to the limitation of the specified dimension of the tire.

It is preferable that the width of at least one inclined belt layer (at least one of the width BW3a of the inclined belt layer 3a and the width BW3b of the inclined belt layer 3b in the figure) is larger than the width BW2 of the circumferential belt layers 2a, 2b. By this configuration, it is possible to secure in-plane shear rigidity of the tread portion required for abrasion performance and cornering performance of the tire.

In FIG. 3 the width BW3a of the inclined belt layer 3a is wider than the width BW3b of the inclined belt layer 3b. As shown in FIG. 3 it is preferable that the inclined belt layers 3a, 3b have different widths. If the inclined belt layers 3a, 3b have the same width, sudden hardness change in the belt layer edge occurs, which is likely to degrade separation resistance in the belt layer edge.

It is preferable that the inclined belt layers 3a, 3b have the width of not less than 70% of the total width TW of the tire. When the cords of the inclined belt layers 3a, 3b intersect with each other in the range (shoulder portion) of not less than 70% of the tire total width TW, it is possible to restrain uneven abrasion of the shoulder portion. It is preferable that the inclined belt layers 3a, 3b have the upper limit of the width of 90% of the total width TW due to the limitation of the specified dimension of the tire.

The cords of the inclined belt layer 3a, 3b are inclined preferably at not less than 40 degrees, more preferably at not less than 50 degrees with respect to the tire equatorial plane CL to achieve superior abrasion and durability performances.

In the case where the inclination angle of the cords of the inclined belt layers 3a, 3b with respect to the tire equator CL is less than 40 degrees, the inclined belt layers 3a, 3b are largely deformed when the tire contacts the ground, the rubber between the inclined belt layers 3a, 3b and the circumferential belt layers 2a, 2b receives larger strain (distortion). As a result, separation between the above-mentioned layers easily occurs.

Example

Hereinafter, examples of the present invention will be described but the present invention is not limited only to these examples.

Example tires, Comparative Example tire and Conventional Example tire having the specifications shown in Table 1 are experimentally produced and evaluated for durability and abrasion performances.

Each example tire with the tire size of 495/45R22.5 has one or more circumferential belt layers and two inclined belt layers. The circumferential belt layer has a so-called WAVY cord which is made of an inextensible metal cord and shaped in a wave pattern. In Table 1, the angle "R50" of the inclined belt layer means that the cords form upward-sloping lines having the inclination angle of 50 degrees with respect to the tire equatorial plane while the angle "L50" of the inclined belt layer means that the cords form downward-sloping lines having the inclination angle of 50 degrees with respect to the tire equatorial plane.

Since the circumferential belt layers of Example tire are formed by using the method of the present invention described with reference to FIG. 4, the circumferential belt layers do not become three layers in the end region in the tire width direction of the circumferential belt layers.

Since the circumferential belt layers of Conventional Example tire and Comparative Example tire are formed by using the conventional method described with reference to FIG. 1, the circumferential belt layers become three layers in the end region in the tire width direction of the circumferential belt layers.

(Durability Performance)

Each example tire is mounted on a rim having the size of 17.00×22.5, inflated with an internal pressure of 900 kPa and subjected to drum run for the distance of 30,000 km under the condition of a load of 5,800 kg and a drum rotation speed of 60.0 km/h. Afterward, the tire is broken down to measure fatigue strength of the cord of the circumferential belt layer and to evaluate durability performance.

The fatigue strength is indexed with the strength of Conventional Example tire being defined as 100. The larger index value means the larger fatigue strength, that is to say, the better durability performance.

(Abrasion Performance)

The abrasion amount of the tread is measured simultaneously with the above-mentioned evaluation of durability performance. The results are shown in index value with the abrasion amount of Conventional Example tire being defined as 100. The better index value means the better abrasion performance.

TABLE 1

| | | Conventional Example | Comparative Example | Example 1 | Example 2 | Example 3 | Example 4 | Example 5 | Example 6 |
|---|---|---|---|---|---|---|---|---|---|
| Tire width [mm] | | 505 | 505 | 505 | 505 | 505 | 505 | 505 | 505 |
| Circumferential belt layer | Angle [deg.] | 0 | 0 | 0 | 0 | 0 | 0 | 0 | 0 |
| | Width [mm] | 370 | 370 | 370 | 370 | 350 | 370 | 370 | 400 |
| | Strip width [mm] | 20.0 | 20.0 | 20.0 | 20.0 | 20.0 | 20.0 | 20.0 | 20.0 |

TABLE 1-continued

|  |  | Conventional Example | Comparative Example | Example 1 | Example 2 | Example 3 | Example 4 | Example 5 | Example 6 |
|---|---|---|---|---|---|---|---|---|---|
|  | Presence of three layers | Yes | Yes | No | No | No | No | No | No |
| Inclined belt layer | Angle [deg.] | R50 | R50 | R50 | R50 | R50 | R30 | R50 | R50 |
|  | Width [mm] | 420 | 420 | 420 | 420 | 420 | 420 | 350 | 420 |
| Inclined belt layer | Angle [deg.] | L50 | L50 | L50 | L50 | L50 | L30 | L50 | L50 |
|  | Width [mm] | 210 | 390 | 390 | 210 | 390 | 390 | 350 | 390 |
| Durability performance |  | 100 | 100 | 120 | 115 | 120 | 110 | 105 | 125 |
| Abrasion performance |  | 100 | 120 | 120 | 100 | 100 | 100 | 120 | 120 |

It is found from Table 1 that durability performance and abrasion resistance of Example tires are improved since the layered structure in the belt end region of the circumferential belt layer is appropriate.

In Example tire 4, since the inclination angle of the cord of the inclined belt layer is small such as 30 degrees with respect to the tire equatorial plane, hardness difference between the end of the inclined belt layer and the outer region thereof in the tire width direction is large so that abrasion performance may be degraded. However, in the Example tire 4 the width of the inclined belt layers is sufficiently wide so as to secure the similar abrasion performance to that of Conventional Example tire.

In Example tire 6, since the width of the circumferential belt layers is wide, the ground contact pressure of shoulder portions is increased and abrasion performance is improved.

What is claimed is:

1. A method of forming at least one circumferential belt layer of a pneumatic tire, the circumferential belt layer being disposed in a radially outer side of a crown portion of a carcass of the tire and formed by spirally winding a strip in a circumferential direction of the tire, the strip being made of at least one rubber-coated cord extending substantially parallel to a tire equatorial plane, the method comprising:
    assuming that a region having twice the width of the strip from an edge in a tire width direction of the circumferential belt layer toward the tire equatorial plane is defined as a belt end region,
    a first step of winding the strip for a half length of an outer circumferential length of the crown portion of the carcass substantially parallel to the tire equatorial plane from a widthwise innermost side of the belt end region;
    a second step of winding the strip for the remaining half length while shifting the strip for the width of the strip from a widthwise inner to outer side in the belt end region; where a starting point of the second step is a terminal point of the first step;
    a third step of winding the strip for the outer circumferential length of the crown portion of the carcass substantially parallel to the tire equatorial plane in the belt end region; where a starting point of the third step is a terminal point of the second step;
    a fourth step of winding the strip for the half length of the outer circumferential length of the crown portion of the carcass while shifting the strip for the width of the strip from the widthwise outer to inner side in the belt end region; where a starting point of the fourth step is a terminal point of the third step; and
    a fifth step of winding the strip for the remaining half length substantially parallel to the tire equatorial plane in the belt end region; where a starting point of the fifth step is a terminal point of the fourth step.

2. The method of forming at least one circumferential belt layer of a pneumatic tire according to claim 1, further comprising:
    in a belt central region which is next to the belt end region, winding the strip for the half length of the outer circumferential length of the crown portion of the carcass substantially parallel to the tire equatorial plane;
    in the belt central region, winding the strip for the remaining half length while shifting the strip for the width of the strip in the width direction; and
    repeating the winding steps in the belt central region to form the circumferential belt layer.

* * * * *